United States Patent [19]

Bergmann et al.

[11] 4,129,062
[45] Dec. 12, 1978

[54] MACHINE FOR MACHINING TUBES HAVING HELICAL WELD SEAMS

[75] Inventors: Klaus W. Bergmann, Spenge; Günther B. H. Steffen; Herbert Mönkemöller, both of Bielefeld, all of Germany

[73] Assignee: Bergmann & Steffen OhG, Salzuflen, Germany

[21] Appl. No.: 654,043

[22] Filed: Jan. 30, 1976

[30] Foreign Application Priority Data

Jan. 30, 1975 [AT] Austria ................................. 694/75

[51] Int. Cl.² ......................... B23C 1/00; B23C 1/16; B23D 1/00
[52] U.S. Cl. ................................ 90/11 R; 90/11 C; 90/11.42; 90/20; 82/5
[58] Field of Search .................. 90/20, 11.4, 11.44, 90/11.48, 11.58, 11.6, 11.62, 11.64, 11.66; 51/48 HE, 90, 95 LH; 228/13, 125; 82/5; 408/118; 144/205

[56] References Cited

U.S. PATENT DOCUMENTS

| | | | |
|---|---|---|---|
| 1,365,271 | 1/1921 | Reagles | 144/205 |
| 3,070,053 | 12/1962 | Woolley et al. | 228/13 |

*Primary Examiner*—Othell M. Simpson
*Assistant Examiner*—K. L. Abercrombie
*Attorney, Agent, or Firm*—Edmund M. Jaskiewicz

[57] ABSTRACT

A method of machining a tube having a helical weld seam including internal and external weld beads in which the internal and external weld seam beads of the tube are simultaneously reduced by machining and a machine for carrying out said method comprising a machine bed, at least one tube bearing means mounted on the machine bed and for supporting the tube, and power-driven tools mounted so that, in use, one tool is located within the tube and one tool located outside the tube, and adapted to be displaceable in dependence upon the helical weld seam in the longitudinal extension of the tube and following the weld seam; said tools in use thereby opposing each other on the sides of the wall of the tube.

7 Claims, 10 Drawing Figures

X70 $O_{s_{min}} = 49 \, kp/mm^2$

: φ 914,4 mm  14,5 mm

|   |   | $\sigma_S$ kp/mm² | $\sigma_B$ kp/mm² | $\delta_S$ % |
|---|---|---|---|---|
| $P_1$ |   | 49,1 | 62,0 | 26,5 |
|   |   | 49,7 | 63,5 | 27,2 |
| $P_2$ | ıı | 47,7 | 63,3 | 7,3 |
|   |   | 46,4 | 62,0 | 6,7 |
| $P_3$ | ıı | 49,7 | 64,1 | 17,7 |
|   |   | 49,7 | 64,7 | 18,8 |

MACHINE FOR MACHINING TUBES HAVING HELICAL WELD SEAMS

Prior Application: In Austria on Jan. 30, 1975 No. A 694/75.

The present invention relates to a method and a machine for processing helically or otherwise welded tubes and a helically or otherwise welded tube whenever treated in accordance with the method and the machine of the invention.

Helically welded tubes are required nowadays by the user to have a higher resistance owing to more stringent operating conditions and to the progressively increasing safety demands with regard to avoidance of brittle fracture. This applies especially to such helically welded tubes which are laid under water or are subjected to bending stress in the ground.

It is known from literature that an irregular stress distribution occurs during welding and multiple-axis stress conditions occur in the region of the weld seam. Both phenomena render, with a ductile material, plastic deformation difficult and often cause the welded part to fail.

It is an object of the invention to provide a method which results, in a simple and reliable manner, in the strength of the tubes in the region of the weld seam and thus the fracture expansion of the weld seam being increased. The method should permit the processing of the outside surface and inside surface of the tube simultaneously in one operation.

A further object of the invention is to provide a machine which is simple and economical to assemble and permits a rational method of operation for machining the tubes internally and externally.

The provision of a tube economically increased in strength and stressability is a further object of the invention.

In accordance with the invention a method of processing helically or longitudinally welded tubes involving the removal of the weld bead is characterised by the feature that the weld seam crown or weld bead of the weld seam on the outer and inner surface of the tube is simultaneously reduced by machining to the maximum of the tube thickness; this machining of the weld seam being preferably carried out by milling or grinding, whereby the weld seam machining may be effected with the tube rotating or stationary, wherein inside and outside the tube a tool is applied with relative rotation with respect to the tube in dependence upon the pitch of the helical seam.

Also according to the invention a machine for machining welded tubes and for carrying out the above method comprises on a machine bed at least one and preferably several mountings, such as chucks and support rams, for retaining the tube in position or possibly rotating it, and a tool provided with a drive for internal machining the weld beads and a tool also provided with its own drive for external machining the weld beads.

The uniform reduction of the weld bead along the helical seam may be ensured by provision of a feeler associated with each tool and which feels the tube wall and hence prevents excessively deep penetration of the tool especially in the case of untrue sections of the tube.

The internal and external tool, each with its drive, constitute a machining unit and both machining units are synchronized in their displacement movement and their circulating movement respectively and are independent of the pitch of the helical weld seam.

With the reduction of the weld bead with a rotary tool (e.g. side milling cutter or grinding wheel) this tool is pivoted in accordance with the weld seam pitch, so that the weld seam and tool axis enclose a right angle; this step ensures that with the reduction of the weld bead no cutting occurs into the outside and inside jacket of the tube respectively.

To avoid any sag of the tube due to its dead weight, the tubes are supported during machining internally by rotating machining units by means of support jacks carried along therewith, and on the outside supported by retractable supports, such as hydraulic support struts. However when the tube is rotated, the latter is retained in a chuck at one end and rotated thereby and supported along its length by stationary supports.

Both processing units are displaced by a common drive or by separate drives and synchronized in their displacement and rotary movement.

The machined waste accrueing in the interior of the tube may be removed by an extraction device.

Favourable further developments of the main method and apparatus claim are shown in the subclaims.

The inventive subject matter extends not only over the features of the individual claims but also their combination.

The method in accordance with the invention is used for simultaneously reducing the internal and external weld beads in helically welded tubes so that the surface tension of the weld seam is reduced on both sides and the elongation at break is substantially increased — thus permits the tubes to be subjected to greater stress.

By removing the weld beads, the weld seam notches are removed simultaneously and permitting, after the reduction of the weld bead, the subjection of the tubes to a continuous inductive tempering without hardening cracks being formed by the weld seams.

The method permits in one operation the simultaneous reduction of the weld beads on the inside and outside, which produces a rational and economical machining of the tubes.

The machine of the invention is of simple structure and permits a reliable material reduction of the weld beads in one run due to the structure of its two machining units.

Moreover, the removal of the weld beads is satisfactorily ensured to the maximum tube thickness by a simple and reliable feeler and adjustable tools whilst avoiding incisions.

A helically welded tube in accordance with the invention due to its internal and external weld seam machining has a favourably increased elongation at break in the region of the weld seam, which substantially increases the range of application and the stressability of the tube.

Test have shown that with bending tests with weld beads machined in accordance with the invention, the bending angle is increased by a multiple (e.g. threefold) compared with unmachined weld beads.

The method in accordance with the invention has been specifically provided only for high-resistant steels, thus for steels having a yield point (strength) of between 40 and 50 $k_p/mm^2$, which corresponds substantially to from 50 to 700 $N/mm^2$ (Newton).

In softer steels, the machining on both sides of the weld seam bead is not as successful as with harder steels of the aforesaid strength, so that the method in accordance with the invention and the helically welded tube produced thereby is to be applied mainly to steels of higher resistance.

The invention will be described further, by way of example, with reference to the accompanying drawings, in which.

Figure 1:
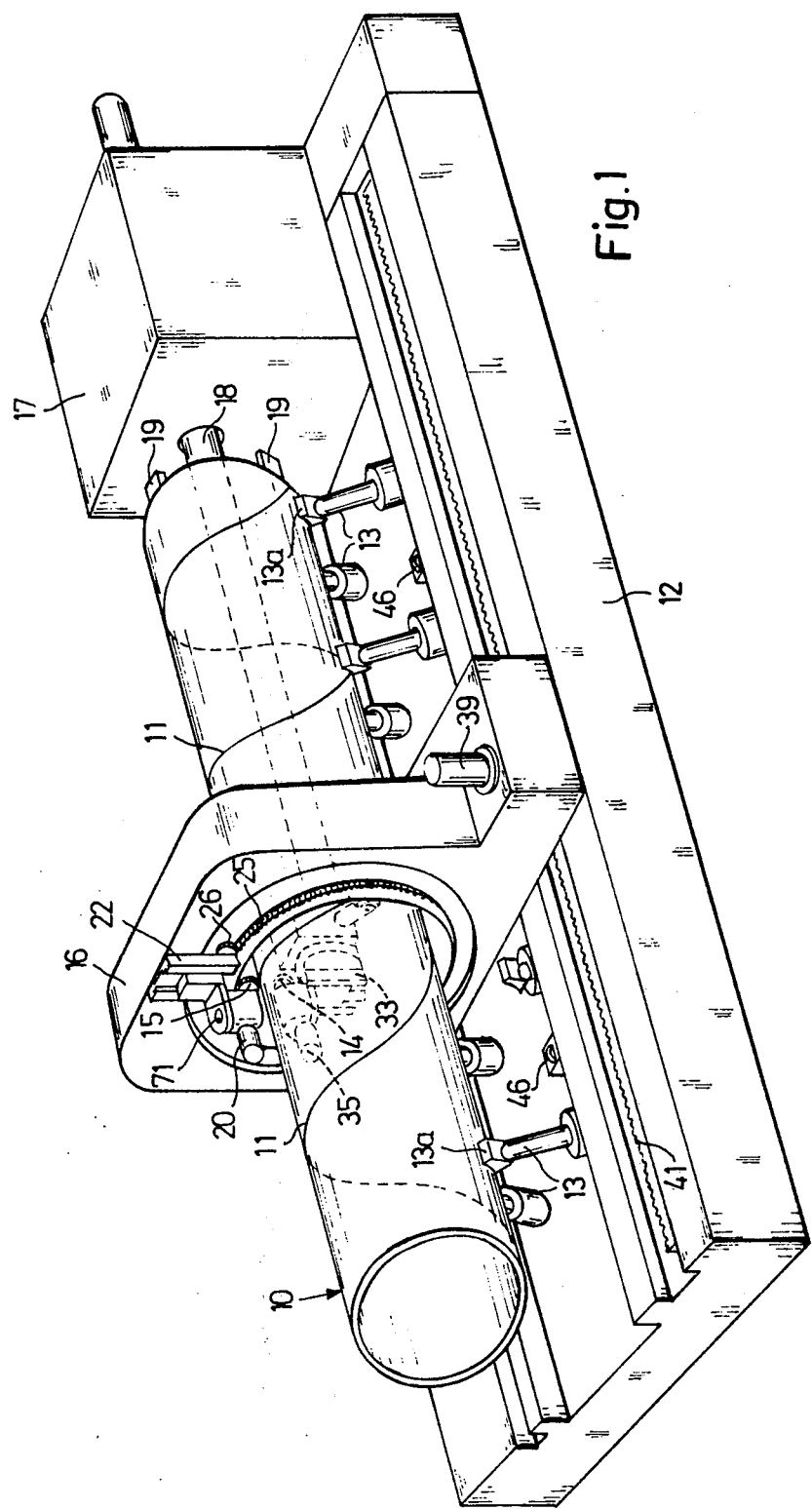
FIG. 1 is a perspective view of a machine for reducing by cutting of the external and internal weld beads in a helically welded tube and tools for rotating and advancing along the length of the tube.

A machine for machining tubes and more especially for machining the seams of helically welded tubes 10 has a machine bed 12 which has several bearings 13 mounted thereon for locating the tube 10 to be machined and two power driven tools displaceable in dependence upon the pitch of the helical weld seam 11 in the longitudinal extension of the tube. The two power driven tools comprise a tool 14 located internally of the tube 10 and a tool 15 located externally of the tube which simultaneously reduce by cutting (chip-removing) the external and internal weld seam crown or weld bead 11a to the maximum tube wall thickness, so that the weld seam 11 on the outside and inside surface has a flat surface 11b substantially flush with the tube surface.

Milling cutters, especially side milling cutters, are preferably used as tools 14, 15 and their axes of rotation assume right angle positions relative to the seam course and hence with their cutting milling surfaces operate in longitudinal extension of the helical weld seam 11. In an alternative arrangement the milling tools 14, 15 may be provided by grinding tools or profile cutters or profile grinders.

Figure 2:
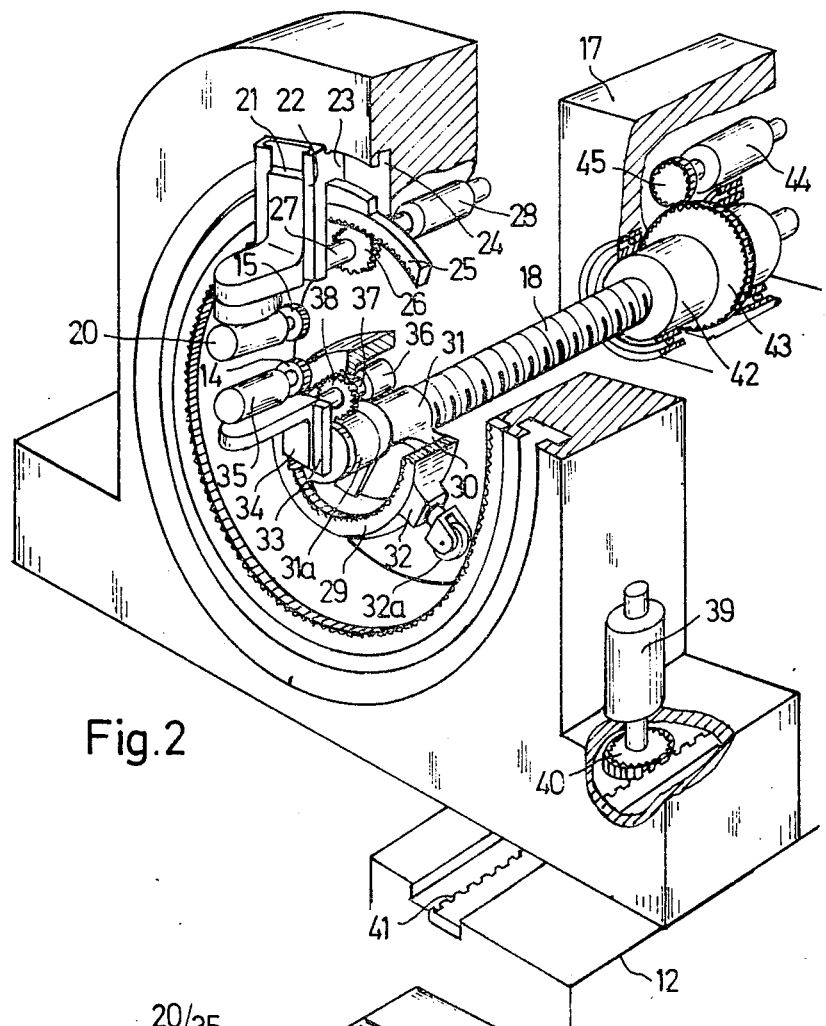
FIG. 2 is a perspective view of the tools rotating around the tube and located in a guide block for movement in dependence upon the pitch of the helical weld seam.
Figure 3:
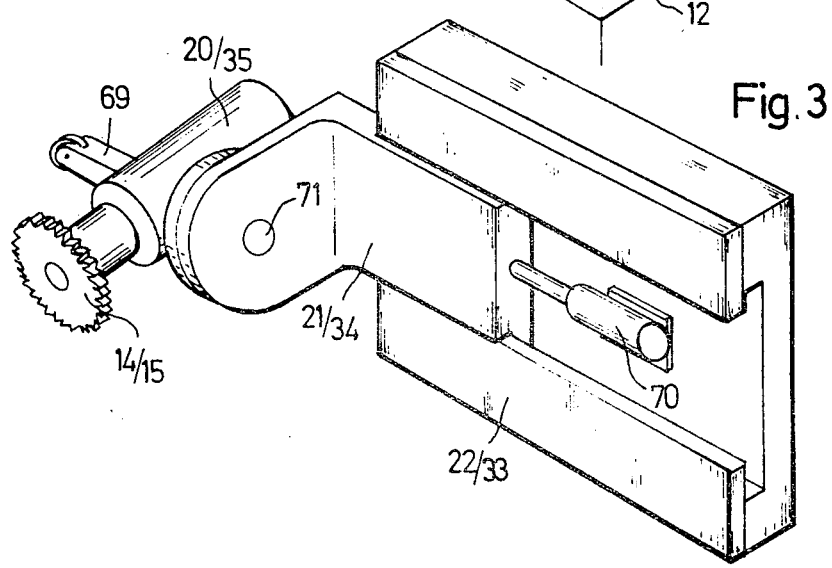
FIG. 3 is a perspective view of a tool with associated feeler.

With reference to the embodiment of FIGS. 1 and 2 tube 10 is shown retained in bearings and in which the two tools 14, 15 rotate in accordance with the helical weld seam 11 and are displaced in the longitudinal extension of the tube, said tube being machined in this machine simultaneously on the inside and outside surface.

On the machine bed 12 and below and laterally of the tube 10 to be machined, a plurality of support rams are provided as bearings 13 and arranged spaced in series in longitudinal extension of the tube; said rows of bearings 13 being inclined diagonally upwards and relative to each other and provide the tube 10 with an abutment. Each opposite pair of support rams 13 extend diagonally inclined upwards and relative to each other and with abutment members 13a at their top ends engage the outer surface of the tube so that the two opposing support rams 13 form a prismatic tube support (support block).

These support rams 13 are adapted so as to provide a cushioned support for compensation of any irregularities in the tube 10 and are preferably formed of pressure medium cylinders such as hydraulic cylinders which compensate for any irregularities in the tube section and are also adjustable to accommodate various diameters of tube 10.

A guide block 16 surrounds the tube 10 held rotatably against the outer surface of the tool 15 and is mounted on the machine bed 12 so as to be displaceable in the longitudinal extension of the tube. A gearing 17 or a gear housing 17 is provided in an end region of the machine bed 12 and said gearing accommodates a feed spindle 18 (screw spindle) which is displaceable in the longitudinal extension of the tube and which engages in the tube 10 and carries the internal tool 14 directly on its free end.

The gearing 17 may have radially adjustable clamping claws 19 provided thereon which engage in the tube 10 and act to center the tube. The external tool 15 with its driving motor, such as an electric motor, is retained on a slide 21 which is mounted so as to be continuously variable in a radial direction spaced from the tube jacket in a slide guide 22. This slide guide 22 engages with a guide member 23 in a circular encircling guide groove 24 having a recessed cross-section, such as a T-shaped cross-section, dovetail cross-section, of the guide block 16, and is retained in this groove 24 to rotate around the tube 10. A gear ring (internally toothed gear ring) 25 is secured on the guide block 16 and a gearwheel 26 meshes therein. The gearwheel 26 is connected via its shaft 27 to the slide guide 22 and its own drive 28, such as an electric motor. The drive 28 drives the shaft 27 and hence the gearwheel 26 which is in rolling engagement with the gear ring 25 and hence causes rotary movement of the slide guide 22 in the groove 24 so that the tool 15 rotates on the outside therewith around the tube 10.

The drive 28 with gearwheel 26 is retained by the shaft 27 against the slide guide 22 and to rotate therewith. A gear ring (internally toothed gear ring) 29 is located around the free end of the feed spindle 18 and is mounted, by means of spacing struts 30, with spacing around the feed spindle 18. These spacing struts 30 are secured to a bearing 31 which is mounted on the free end of the feed sprindle 18 and accommodates the latter. The bearing 31 with struts 30 and gear ring 29 forms a housing whereby the internal tool 14 rotates. The gear ring 29 is supported by several radial rams 32 against the inside surface of the tube 10. For compensating irregularities in the sections of the tube or for different tube diameters the support rams 32 are made resilient per se and are hence longitudinally variable, preferably by longitudinally adjustable means such as pressure medium cylinders. Each support ram 32 is provided with a roller 32a in rolling engagement with the inside surface of the tube. At the end face of an adjusting member 31a of the bearing 31, a slide guide 33 is secured which retains a radially adjustable slide 34 on which a drive, such as an electric motor or hydraulics motor, meshes with a gearwheel 40 in a racked bar 41 of the machine bed 12.

The internal tool 14 is displaced by the longitudinal movement of the feed spindle 18 which engages through a nut 42 with gearwheel 43 mounted so as to be rotatable in the gearing 17 and retained in the longitudinal extension of the spindle. A drive 44, such as an electric motor or hydraulic motor, mounted in the gearing 17 has a pinion 45 meshing with the gearwheel 43. When pinion 45 is rotated it causes a rotary movement of the nut 42 which in turn by its rotation effects a longitudinal displacement of the feed spindle 18 so that thereby the internal tool 14 is displaced in the direction of the longitudinal extension of the tube.

The longitudinal displacement of both tools 14 and 15 by its displacement members (16, 39, 40, 41, or 18, 42, 43, 44, 45) and their rotary movement by their own drive is dependent upon the pitch of the helical weld seam 11.

For reduction (milling) of the weld seam crowns or beads 11a both tools 14 and 15 are inserted in the gearing end region of the machine bed and then a tube 10 located in its bearings 13, 19 and in the tube-end-clamping means 19. Both tools 14 and 15 are now rotated about the tube 10 by their own drives 28 and 36 and longitudinally displaced in the longitudinal extension of the tube by the drives 39, 44 so that they reduce by cutting simultaneously the inside and outside welding bead 11a in accordance with the course of the helical weld seam 11.

Since the guide block 16 is displaced substantially over the whole length of the machine bed 12, it is necessary to retract certain support rams 13 projecting into the displacement range so that the guide block 16 can pass. For this purpose, each support ram 13 has an electric switch 46, associated therewith (e.g. as a mechanical limit switch, photoelectric cell or the like) which receives an impulse by the guide block 16 by impact or overlap and thereby inserts the support block 13 introduced with the guide block 16. Hence there is retracted only the support ram 13 projecting into the movement region of the guide block 16 whilst all the other support rams 13 remain in their extended tube support position. When the guide block 16 has passed the region of the retracted support ram 13, the support ram 13 actuated by the switch 46 is extended again into its supporting bearing position.

Figure 4:
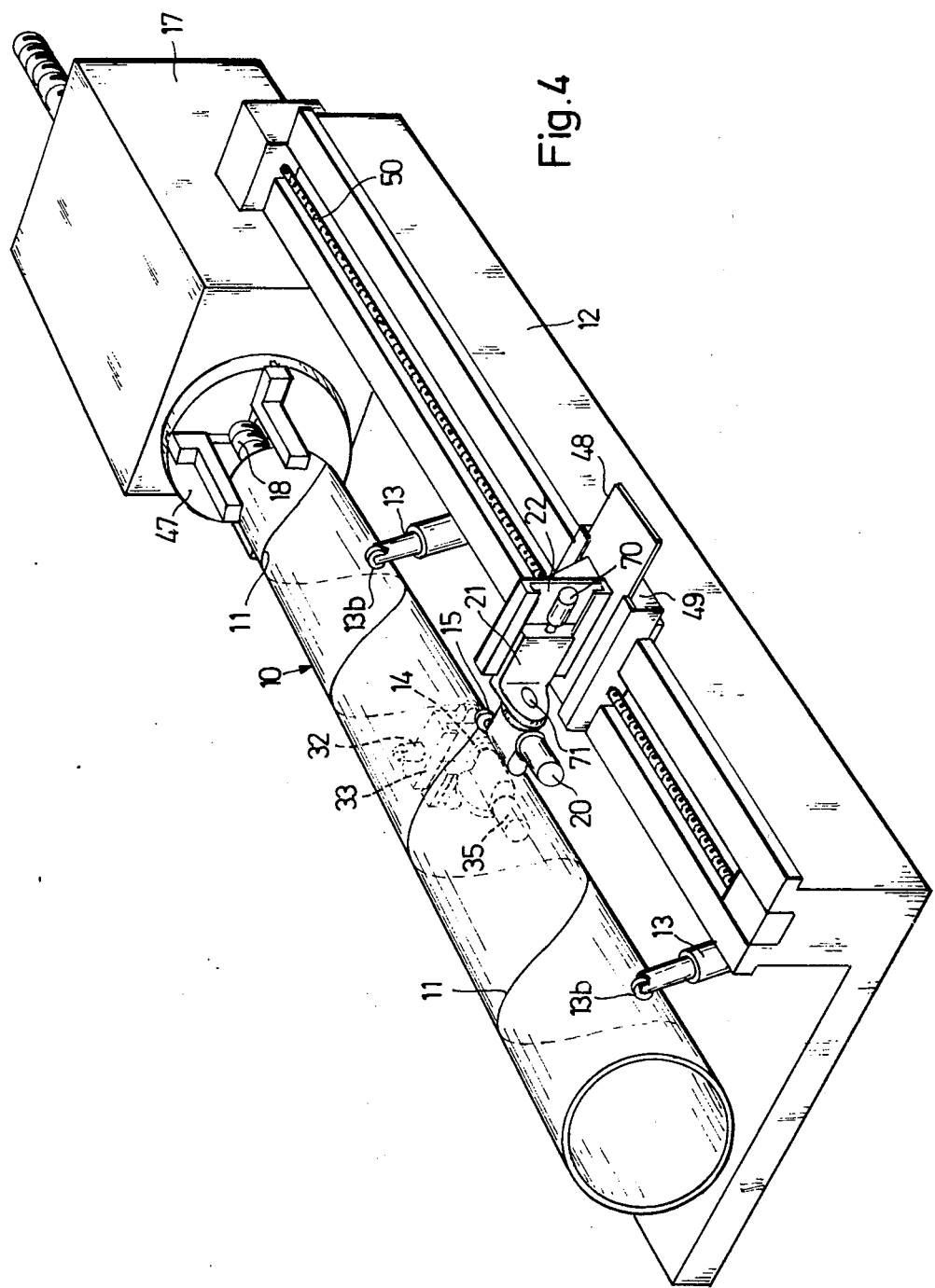
FIG. 4 is a perspective view of a machine for reducing by cutting of the external and internal weld seam crown or weld bead of helically welded tubes with a rotatable tube and tools displaceable in longitudinal extension of the tube.
Figure 5:
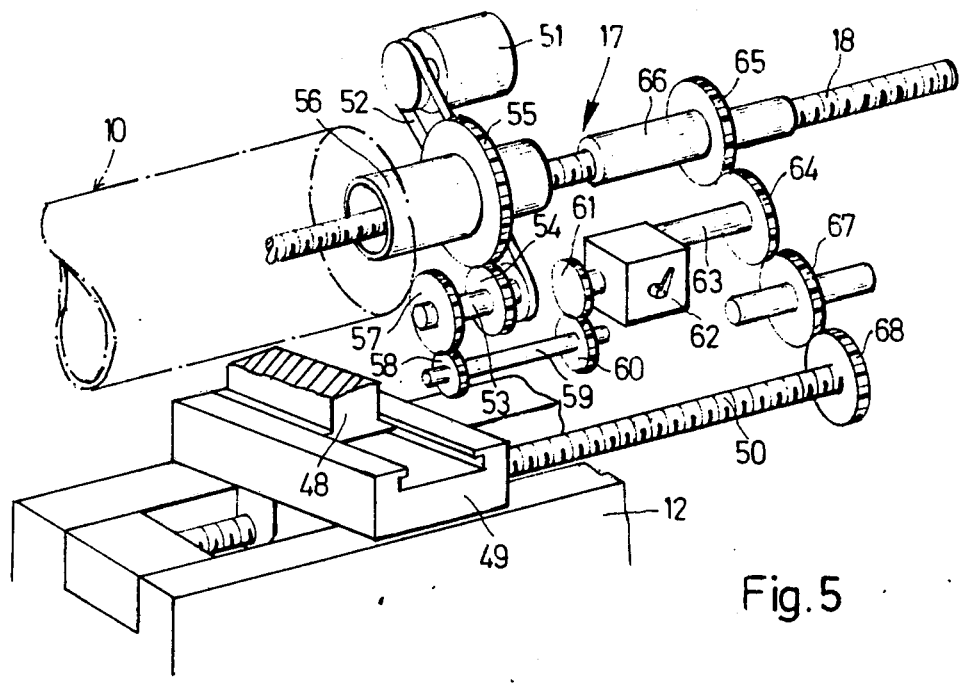
FIG. 5 is a perspective view of the drive for effecting tube rotation and displacement of the tools of the machine of FIG. 4.
Figure 6:
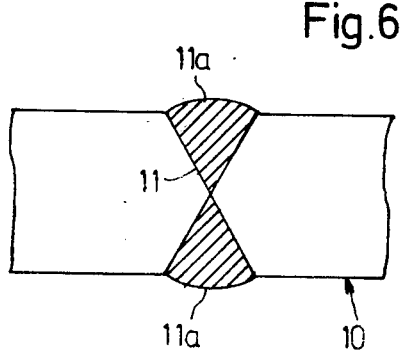
FIG. 6 is a cross-section through a tube wall having internal and external weld bead.
Figure 7:
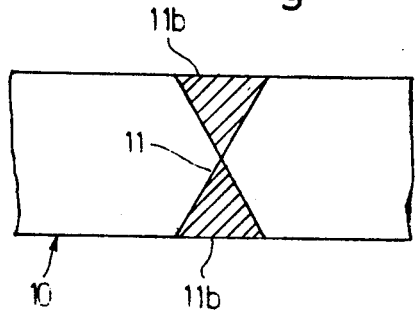
FIG. 7 is a cross-section through the same tube wall having the weld bead removed from the inside and outside surfaces.

Reference is now made to the embodiment of FIG. 4 and 5. Herein the two tools 14 and 15 do not carry out any rotary movement but are displaced in the longitudinal extension of the tube in dependence upon the helical weld seam 11 and the tube 10 to be machined executes the rotary movement. Thus, the tube 10 is again supported on the ram-like bearings 13 and is retained at one end in a driven chuck 47 which imparts the rotary movement thereto. The supporting rams 13 on the end face are provided with rollers 13b to facilitate the rotary movement of the tube 10 and are in rolling engagement along the outer surface of the tube.

The outer tool 15 with its drive 20 abuts against the slide 21 which is adjustable and variable respectively in the slide guide 22 with spacing from the tube 10. This slide guide 22 is retained on a further slide 48 which is displaceably and adjustably mounted in a slide guide 49 displaceable in longitudinal extension of the machine bed 12 normal to the longitudinal extension of the tube.

The slide guide 49 serves for the longitudinal displacement of the tool 15 which displacement is dependent upon the speed of rotation of the tube 10 and the pitch of the helical weld seam 11. The slide guide 49 is reciprocated by a feed spindle (screw spindle) 50 rotatably mounted in the machine bed 12. The internal tool 14 with its slide guide 33, slide 34 and drive 35 is mounted on the free end of the feed spindle (screw spindle) 18 engaging in the tube 10 and displaceable in the longitudinal extension of the tube.

The drive of both spindles 18 and 50 for the feed movement of the two tools 14 and 15 and the rotary movement of the tube 10 is effected by a common drive 51 such as an electric motor, and by several transmission means; drive 51 and transmission means being located in the gearing 17 which forms a housing.

The drive 51 is coupled via a belt or gearwheel drive 52 to a driving shaft 53 which meshes by means of a gearwheel 54 with a gearwheel 55 which is mounted on a spindle 56 retained by the chuck 47 and rotated, said spindle having the feed spindle 18 passing therethrough. A further gearwheel 57 is secured on the shaft 53 and engages in a transmission gearwheel 58 of a shaft 59 extending parallel to the spindle 18 and shaft 53.

A second gearwheel 60 mounted on this shaft 59 meshes with a gearwheel 61 of a feed gear 62 which controls the feed of both spindles 18 and 50. A driving shaft 63 projecting from the feed gear 62 supports a gearwheel 64 which on the one hand meshes with a nut 66 embracing positively the screw spindle 18 and located in the gearing 17 secured against longitudinal displacement for the longitudinal displacement of the screw spindle 18 and on the other hand via a gearwheel 67 engages in a driving wheel 68 of the screw spindle 50 for its rotation and the displacement of the slide guide 49 occurring thereby (see FIG. 5).

For machining the tube 10 with the machine according to FIGS. 4 and 5, the slide guide 49 near the gearing 17 and the internal feed spindle 18 also near the gearing 17 are moved into the original position so that both tools 14 and 15 assume their initial operational position.

A tube 10 may now be clamped in the chuck 47 and supported on the bearings 13.

Then the main drive 51 is activated and the inherent tool drives 20, 35 switched on. The main drive 51 causes the axial rotation of the tube 10 and simultaneously the feed movement of the two tools 14, 15 which during rotation of the tube are uniformly displaced in accordance with the pitch of the helical weld seam in longitudinal extension of the tube 10 and internally and externally reduce (mill off) the weld bead 11a.

The weld bead 11a should be milled down to such an extent that the flat seam surface 11b produced is flush with the outer and inside surface of the tube 10. To prevent machining of the weld bead 11a to excess, the slide 21, or 34 of both tools 14, 15 are provided with a feeler 69, such as a feeler pin, feeler roller or the like, having a feeling surface which abuts against the outer or inner surface and simultaneously being coplanar with the operating tool surface so that in accordance with feeling area of the feeler 69 feeling the tube wall, the tools 14 and 15 are displaced to a greater or lesser extent in the direction of the tube wall. This feeler 69 more especially feels the irregular sections of the tubes 10 which might possibly cause excessive milling down of the weld bead 11a.

The slide 21, 34 is connected to the slide guide 22, 23 via a compensating device 70, such as a pressure medium cylinder, spring unit or the like, and the guide in its compressive force is greater than the required bead-removing operating force of the tools 14, 15 so that this pressure device 70 constantly retains the slide 21, 34 with the feeler 69 in abutment against the tube surface. The feeler 69 counteracts this pressure device 70 mounted on the one hand on the slide guide 22, 23 and connected on the other hand to the slide 21, 34. Moreover, the drive 20, 35 of each tool 14 and 15 is pivotably and adjustably mounted on the slide 21, 34 about the pivotal axis 71, to which axis the pivotal axis of the tool may be fitted in accordance with the pitch of the helical weld seam 11 so that this tool pivotal axis always assumes a right angle with the course (longitudinal extension) of the helical seam 11.

Milling-down the weld bead 11a internally and externally of the tube 10 substantially increases the elongation at break of the tube in the region of the weld seam 11 compared with a non-machined weld seam 11.

Figures 8, 9:
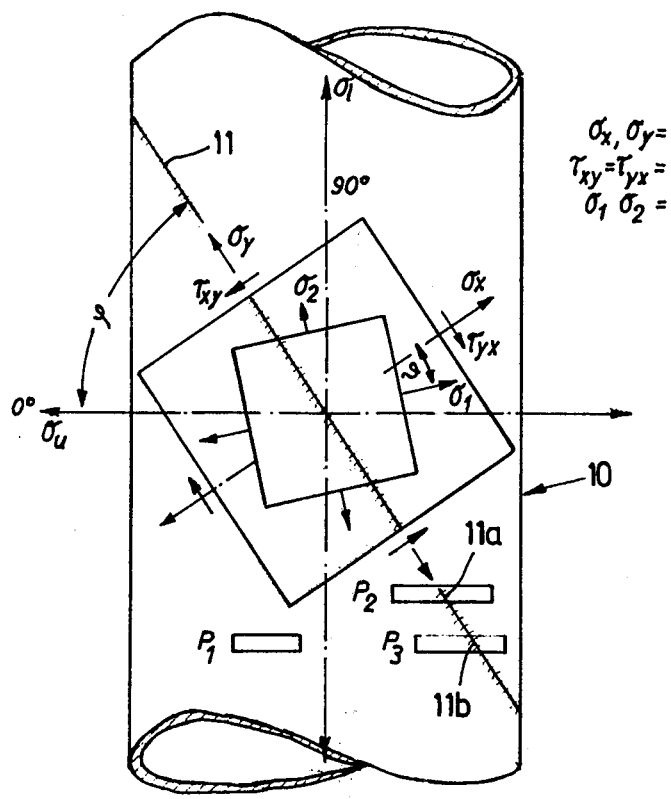
FIG. 8 is a schematic plan view of a part region of the tube with stated test points.
FIG. 9 is a tubular graph of the test values in accordance with the test points of FIG. 8.

FIGS. 8 and 9 of the drawings show in graph form resultant values in a steel tube 10 having a yield limit of 49 kp/mm$^2$ and a diameter of 914.4 mm and a wall thickness of 14.5 mm, if a sample P$_2$ is taken from the weld seam 11 with weld bead 11a and a sample P$_3$ from the weld seam with reduced weld bead 11a.

The elongation at break in the removed weld bead 11a compared with the weld seam 11 with weld bead 11a retained, is increased to more than 160% which provides a substantial improvement in the strength of the tube 10.

The method and machine in accordance with the invention are intended specifically for the simultaneous chip removing or machining of the weld bead 11a internally and externally on helically welded tubes 10 — there is, however, a possibility with this machine to remove weld beads 11a simultaneously internally and externally of longitudinally welded tubes.

The two tools 14 and 15 are preferably located opposing one another on the external and internal surface of the tube 10 so that the weld seam is machined in both sides simultaneously at one position.

Figure 10:
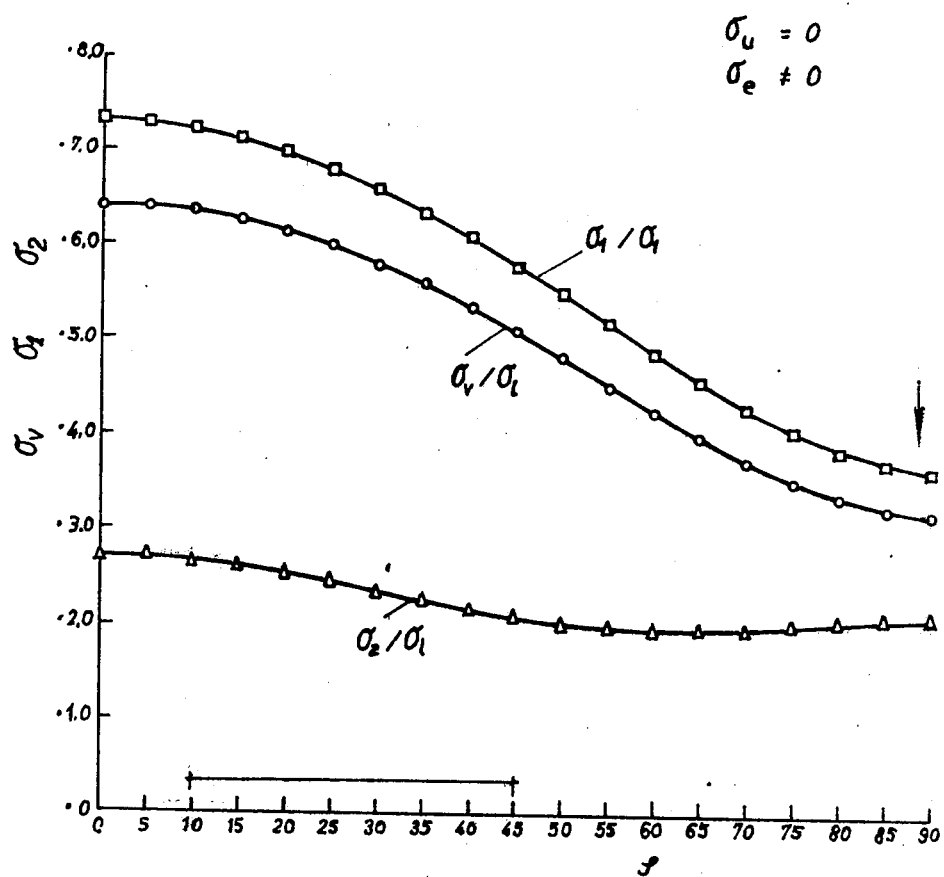
FIG. 10 is a graphic view of the comparison stress $\sigma_v$ compared with seam pitch angle $\phi$.

The extent to which the existence of notches increases the comparison stress is shown in FIG. 10 as function of the angle $\phi$, whereby the inserted values were calculated in accordance with the subsequent equations (1) – (4), which are shown in FIG. 8.

$$\begin{aligned}
\sigma x' &= \sigma u \cdot \sin^2\rho + \sigma l \cdot \cos^2\rho \\
\sigma y' &= \sigma u \cdot \cos^2\rho + \sigma l \cdot \sin^2\rho \\
\tau xy' &= (\sigma u - \sigma l) \cdot \sin\rho \cos\rho
\end{aligned} \right\} \quad (1)$$

$$\begin{aligned}
\sigma x &= a_{K\sigma} \cdot \sigma x' \\
\sigma y &= \sigma y' + \mu \cdot a_{K\sigma} \cdot \sigma x' \therefore \mu = 0{,}3 \\
\tau xy &= a_{K\tau} \cdot \tau xy'
\end{aligned} \right\} \quad (2)$$

$$\sigma_1 = \tfrac{1}{2}(\sigma x + \sigma y) + [\tfrac{1}{4}(\sigma x - \sigma y)^2 + \tau xy^2]^{\tfrac{1}{2}} \quad (3)$$

$$\sigma_2 = \tfrac{1}{2}(\sigma x + \sigma y) - [\tfrac{1}{4}(\sigma x - \sigma y)^2 + \tau xy]^{\tfrac{1}{2}}$$

$$\sigma_v = (\sigma_1^2 + \sigma_2^2 - \sigma_1 \cdot \sigma_2)^{\tfrac{1}{2}} \quad (4)$$

The stress concentration factors $a_{K\sigma}$ of 7.32 or $a_{K\tau}$ of 4.16 correspond to a conventional weld seam notch of 1 mm depth (1) and a notch radius (ro) of 0.1 mm and are calculated in accordance with Neubers equations, i.e.

$$a_{K\sigma} = 1 + 2 (t/\rho)^{1/2}$$

$$a_{K\tau} = 1 + (t/\rho)^{1/2}$$

The essential information of FIG. 10 resides in that the weld seam during bending or laying of the tubes is subjected to a comparison stress of from 6.42 to 4.8 times respectively the value of the longitudinal stress of the tube (with a weld seam angle $\phi$ of between 10° and 45°).

This means, that under these circumstances the material characteristics, such as yield limit are considerably increased in the region of the weld seam. As a result the destruction of the longitudinally welded tubes is to be expected.

It will be understood that this invention is susceptible to modification in order to adapt it to different usages and conditions, and accordingly, it is desired to comprehend such modifications within this invention as may fall within the scope of the appended claims.

We claim:

1. A machine for machining tubes having a helical weld seam and for simultaneously reducing internal and external weld beads by machining, comprising a machine bed, at least one tube bearing means mounted on the machine bed for supporting a tube having a wall with a helical weld seam in the wall, first and second power driven tools mounted such that said first tool is located within the tube and said second tool located outside the tube, said tools thereby opposing each other on the sides of the wall of the tube, and means for displacing said first and second tools in dependence upon the helical weld seam in the longitudinal extension of the tube and following the weld seam, and further comprising a housing on said bed and gearing in said housing, a chuck on said housing connected to said gearing, said tube is mounted in said chuck, said chuck being axially rotatable and having support rams abutting against the outer tube surface, upper end rollers supporting said tube, said displacing means comprising a first feed spindle which is displaceable in the longitudinal extension of said tube on a slide displaceably mounted in the longitudinal extension of the tube on the machine bed, said first tool fixedly retained in the peripheral extension of said tube on said feed spindle.

2. A machine according to claim 1, wherein a master drive is located in said gearing and is connected via transmission means to drive said chuck and the feed of said first feed spindle for the first internal tool and a second feed spindle at the machine bed end for the said second external tool.

3. A machine according to claim 2 wherein said master drive is drivably connected to a first driving shaft which supports a gearwheel which meshes with a spindle traversed by said first feed spindle and rotating the chuck; a second gearwheel is mounted on the first driving shaft to drive a second driving shaft coupled via a gear drive with a feed gear which on the one hand drives a nut for the longitudinal displacement of said feed spindle of a feed spindle rotatably mounted in said gearing and securely located in the longitudinal displacement of said feed spindle of a feed spindle rotatably mounted in said gearing and securely located in the longitudinal extension of the spindle formed by a screw spindle and positively connected thereto, and on the other hand via a gearwheel drive meshes with a gearwheel of said second feed spindle longitudinally displacing said slide of the external tool and comprising a screw spindle rotatably mounted in said machine bed.

4. A machine according to claim 3, wherein said second external tool and its drive is mounted on a slide which is displaceable in a slide guide with spacing relative to said tube, said slide guide via a slide portion is adjustably spaced from said tube in a slide mounted on said machine bed and longitudinally displaceable by said second feed spindle.

5. A machine according to claim 1 wherein said first internal tool and its drive is mounted on a slide which is mounted so as to be radially displaceable on a slide guide retained on said spindle.

6. A machine according to claim 5, wherein said drive of said internal and external tools is pivotal about an axis extending normal to the longitudinal extension of said tube and with the rotary axis of the tool being adjustable at right angles to the longitudinal extension of said helical weld seam.

7. A machine according to claim 5, wherein said slide is provided with feeler means for feeling the wall surface of the tube to be machined, said feeler means with its feeler surface being coplanar with the working surface of said tools extending in the longitudinal direction of the tube, and the slide by interposition of a pressing device which presses the feeler against the wall of the tube and being displaceable in the direction of the wall of the tube mounted on the guide whereby the pressure force of said pressing device is greater than the necessary cutting force of the tools.

* * * * *